United States Patent [19]

Wyke et al.

[11] 4,096,017
[45] Jun. 20, 1978

[54] METHOD AND ARTICLE FOR FORMING FIELD JOINTS ON PIPE COATED WITH THERMOPLASTIC MATERIAL

[75] Inventors: Richard L. Wyke, Bartlesville, Okla.; G. Joe Hennon, Kansas City, Mo.

[73] Assignee: H. C. Price Co., Bartlesville, Okla.

[21] Appl. No.: 770,091

[22] Filed: Feb. 18, 1977

[51] Int. Cl.² .............................................. B29C 19/06
[52] U.S. Cl. ..................................... 156/275; 428/256
[58] Field of Search ......................... 156/275; 428/256

[56] References Cited

U.S. PATENT DOCUMENTS

| | | | |
|---|---|---|---|
| 2,930,634 | 3/1960 | Merritt | 156/275 |
| 3,049,465 | 8/1962 | Wilkins | 156/275 |
| 3,061,503 | 10/1962 | Gould et al. | 156/275 |
| 3,506,519 | 4/1970 | Blumenkranz | 156/275 |

Primary Examiner—Douglas J. Drummond
Attorney, Agent, or Firm—Lowe, Kokjer, Kircher, Wharton & Bowman

[57] ABSTRACT

A method and article for covering and sealing the exposed weld joint area of a pipeline coated with thermoplastic corrosion protective coating is the subject of this application. The article comprises a layer of thermoplastic material that is compatible with the thermoplastic coating. A layer of mastic may also be formed on one side of the thermoplastic material. A resistance wire which is preferably a strip of wire mesh is tack welded or otherwise secured to the thermoplastic strip in two parallel stretches and a third stretch that is transverse to and in contact with the first two stretches. The article is wrapped around the coated pipe with the first two stretches of the resistance wire sandwiched between the pipe coating and the thermoplastic layer of the article and the third stretch of the resistance wire sandwiched between overlapping ends of the layer of thermoplastic material. The resistance wire is then energized to produce enough heat to fuse the two thermoplastic layers into an integral unit.

19 Claims, 5 Drawing Figures

METHOD AND ARTICLE FOR FORMING FIELD JOINTS ON PIPE COATED WITH THERMOPLASTIC MATERIAL

This invention relates to a method and article used in conjunction with the coating of pipelines and, more specifically, to a method and article for coating the area of the weld joint of a pipeline in the field.

All pipelines are provided with some type of protective coating for anti-corrosion purposes. These coatings are applied in two basic manners. One technique is to apply the coating in a coating yard and then ship it to the location of the pipeline for placement in the ground. The second alternative is to coat the pipe "over the ditch" after it is welded and immediately before it is placed in the ground. Yard applied coatings are preferred in many instances because a superior coating job may be performed under the controlled conditions of a coating plant. One problem with a yard applied coating, however, is the need to coat the area of the pipe on either side of the weld joint which is formed in the field to join two pipe sections together. There is normally an area of approximately one meter in length at the weld joint which needs to be coated in the field if the rest of the pipe has been coated in a coating yard.

There are two basic techniques for coating the weld joint area in the field. The first of these is to wrap the weld joint area with a protective tape which overlaps the yard applied coating at either end. One of the primary disadvantages of this technique is that it is not possible to achieve a hermetic seal of great integrity. In this regard, the yard applied coatings generally do hermetically seal the pipe along its length and thus, if tape is utilized in the area of the weld joint, the coating is not of the same quality as on the remainder of the pipe. One reason for this is that whenever tape is utilized to wrap the weld joint area the endmost layers of tape will have their side edges exposed. The exposed adhesive will deteriorate and provide an area where moisture can eventually enter beneath the coating.

The other basic technique for coating the area of the weld joint of pipe in the field is to utilize a field mold which is fitted around the pipe and into which is poured a coating material that is compatible with the coating on the remainder of the pipe. While this process does result in the coating over the area of the weld joint being of generally the same integrity as the coating on the remainder of the pipe, the process is very time consuming and, therefore, expensive.

In recent years new types of pipe coatings have been developed utilizing extruded thermoplastic materials. Coating of this type provides for a hermetic seal of high integrity along the length of the pipe but is not readily suited to either of the aforedescribed techniques for coating the area of the weld joints in the field.

It is therefore a primary object of the present invention to provide a method and apparatus for sealing the weld joint area of pipe coated with thermoplastic corrosion protective coating material.

As a corollary to the above object, an important aim of this invention is to provide a method and article for sealing the area of the weld joint with a coating of the same quality and physical integrity as the coating on the remainder of the pipeline.

It is also an important object of this invention to provide a method and article for sealing the area of the weld joint of a pipeline which is not highly dependent upon the skill of manual labor for uniformity of results.

An aim of the invention is to provide a method and article for sealing the weld joint area of a pipe where an integral plastic to plastic seal is made with no exposed mastic which could deteriorate.

Another one of the objects of this invention is to provide a method and article for coating the area of the weld joints of a pipeline which utilizes a preformed coating pad that may be manufactured under controlled conditions in a coating plant and shipped to the field for usage.

It is also an important aim of this invention to provide a method and article for coating the area of weld joints of a pipeline that is easily adapted to pipe of different diameter.

Another one of the aims of the invention is to provide a method and article according to the foregoing aims and objects which does not utilize a field joint mold with its attendant disadvantages.

Other objects of the invention will be made clear or become apparent from the following description and claims when read in light of the accompanying drawing wherein:

Figure 3:
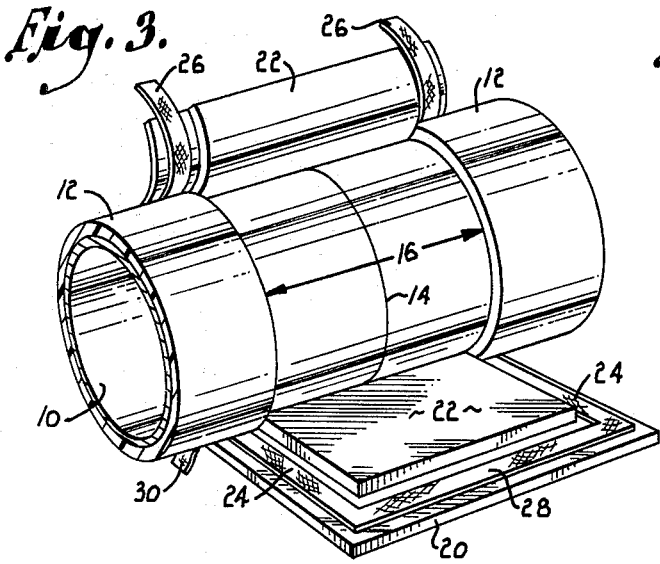
FIG. 3 is a perspective view illustrating the manner in which the article of the present invention is wrapped around the weld joint area of the pipe.

Referring initially to FIG. 3, two lengths of pipe 10 are covered with a thermoplastic material 12 which is not less than about 25 mils in thickness and is preferably within the range of 40 to 75 mils of thermoplastic material such as polyethylene with an under layer of 10 to 20 mils of butyl rubber. The two ends of the pipes 10 are welded together to form a weld joint 14. An area of from one-half to one meter away from the weld joint 14 in opposite directions is left bare at the time the coating 12 is applied so as to permit the utilization of equipment needed to prepare and weld the pipe ends together. This area is designated by arrow and numeral 16 in FIG. 3.

Figure 4:
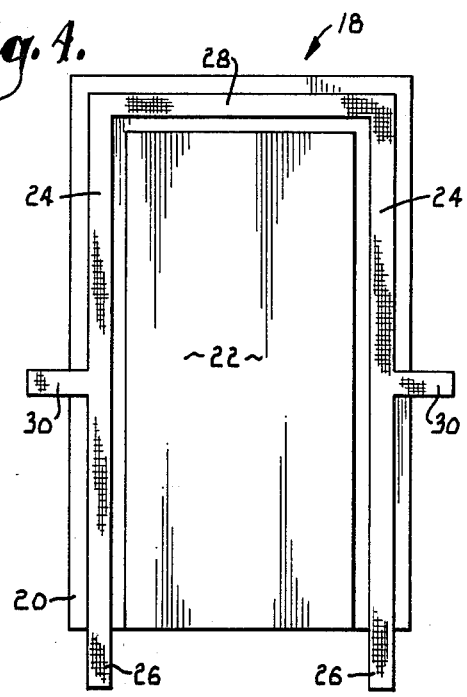
FIG. 4 is a plan view of the article used to cover and seal the weld joint area.

Referring to FIG. 4 of the drawing, a preformed coating pad is designated generally by the numeral 18. Coating pad 18 comprises a layer of thermoplastic material 20 which is cut to a width that is somewhat greater than the distance between the two spaced apart sections of coating material 12 on pipe 10. The layer 20 is also of a thickness of at least about 25 mils and preferably within the range of 40 to 75 mils. The thermoplastic material 20 is, of course, the same as or compatible with the layer of thermoplastic material 12.

It is also desirable to provide on the thermoplastic layer 20 an adhesive panel 22. Panel 22 is preferably formed from butyl rubber and is of a width corresponding to the width of weld joint area 16. The thickness of panel 22 should be equal to the distance from the surface of the pipe 10 to the outer surface of coating layer 12. Thus, if coating 12 comprises a thermoplastic resinous material with an adhesive undercoat, the panel 22 will equal the combined thickness of the adhesive plus the thermoplastic resinous material. In most cases this will result in panel 22 having a thickness of no less than 35 mils and up to 100 mils.

Secured at the surface of thermoplastic layer 20 are first and second lengths of a resistance wire which is preferably in the form of wire mesh 24. Each of the first two lengths of wire mesh 24 include extended ends 26 which project from the end of the pad for purposes to be explained hereinafter.

A third length of the wire mesh, 28, extends transversely of the first two parallel lengths and is in contact with the first two lengths. This third length 28 is disposed adjacent the end of panel 18 that is opposite the end from which extensions 26 project. Finally, two short lengths 30 which serve as lead wires and are also of the wire mesh material are in electrical contact with the first two parallel lengths 24 at points midway along the length of each of the former.

The resistance wire which is used to form lengths 24, 28 and 30 should be designed to provide sufficient resistance when electrically energized to result in adequate heating to melt the thermoplastic materials 12 and 20. For most typical thermoplastic coating materials, and a typical resistance wire, a current of between 30 and 60 amps will be required to achieve the necessary bonding in a reasonable amount of time. A preferred resistance wire is constructed from an alloy of sixty percent nickel, twenty-four percent iron, sixteen percent chromium and 0.1 percent carbon and sold under the trademark "NICHROME" by the Driver-Harris Co. The Nichrome wire is preferably formed into a relatively fine wire mesh.

Figure 1:
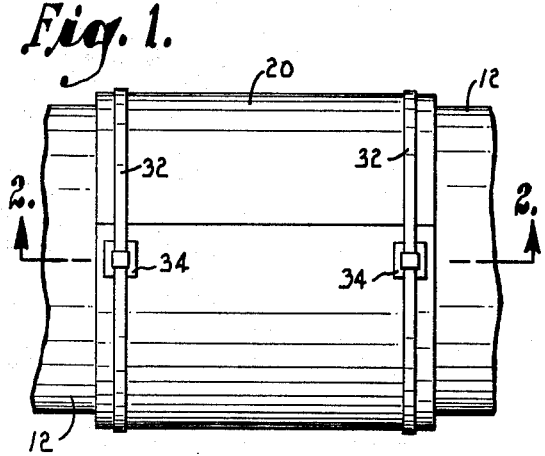
FIG. 1 is an elevational view illustrating the article of the present invention in place around the weld joint area of a pipeline.
Figure 2:
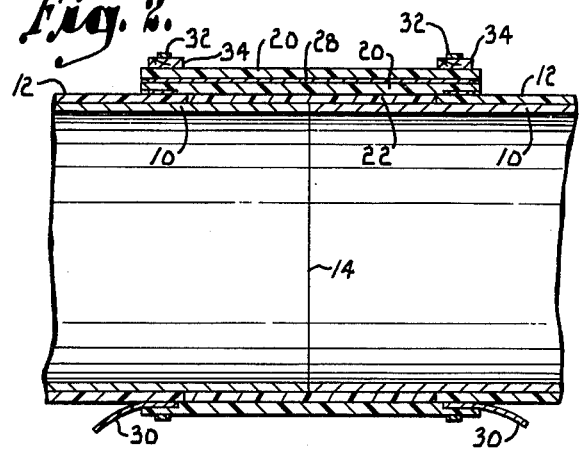
FIG. 2 is a cross-sectional view taken along line 2—2 of FIG. 1.

When the pad 18 is placed around the weld area 16 of pipe 10, the adhesive panel 22 fills the area 16 and the thermoplastic layer 20 overlies the thermoplastic material on the pipe. The first two lengths 24 of the resistance wire are sandwiched between the two thermoplastic layers. The end extensions 26 provide means for effecting a completed electrical circuit around the diameter of the pipe as the pad 18 is overlapped at its ends. Also in this regard, it is to be noted from FIG. 2 that the third length 28 of the wire mesh material is sandwiched between the two overlapping layers of thermoplastic material 20 which result from overlap of the ends. It is also to be noted that short lengths 30 of the wire mesh project from the pad 18 to serve as electrical leads for transmitting current through the pad.

Two wire straps 32 are used to hold pad 18 in place until it has become pernamently welded to the coating 12. In this regard, spacers 34 are employed between the straps and pad 18 to avoid damage to the latter as the straps are tightened down. In this regard, it should be emphasized that there are particular advantages to using a wire in the form of a mesh. The wire mesh will stay near the surface of thermoplastic layer 20 even when stored for a long period of time. The mesh also offers a certain amount of structural strength to the pad 18 and prevents the energized wire from cutting through material 20 or coating 12.

Figure 5:
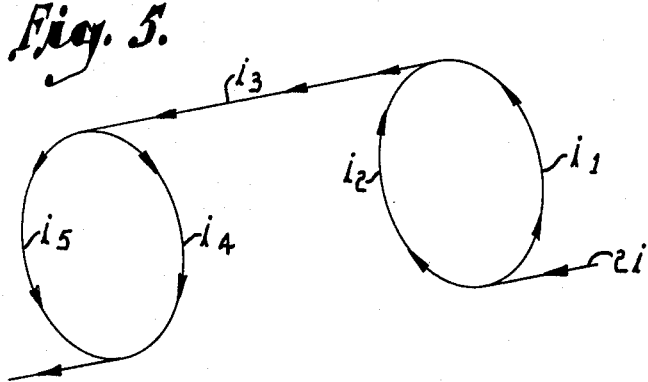
FIG. 5 is a schematic illustration of the current flow through the resistance elements that are employed in the article shown in FIG. 4.

As illustrated in FIG. 5, it is desirable to place leads 30 at points exactly midway between the ends of lengths 24 so that the current flow will be equal in opposite directions away from the leads and around the pipe. This of course results in uniform heating of the thermoplastic material. It is also desirable to select the resistance value for the third length 28 of the wire mesh so that the heat output from this wire will be equal to the output from lengths 24. Assuming that leads 30 are placed midway along lengths 24 so that the current values $i1$ and $i2$ are equal and are also equal to $i4$ and $i6$, a resistance value in wire 28 of 0.25 of the value of the resistance in the wires 24 will result in the energy output through wire 28 equaling the output in each of wires 24. Generally, a current of between 30 and 60 amps for between thirty seconds and five minutes is adequate to achieve integral fusion of the two thermoplastic layers.

From the foregoing it will be apparent that the present invention encompasses a method of joining first and second segments of thermoplastic material whereby a resistance wire is provided and the two segments are brought into contiguous relationship with the resistance wire sandwiched therebetween. The wire is then electrically energized to produce sufficient heat to weld the segments integrally together. Preferably, uniform pressure is applied against the segments that are in their sandwiched positions and the wire is energized. It is particularly desirable to utilize a wire mesh material to avoid any tendency to cut through the thermoplastic material being joined.

The method is particularly applicable to joining together the thermoplastic material used to coat the weld joint area of a pipe with the thermoplastic material used over the remainder of a pipeline. In this case, the thermoplastic material used for coating the weld joint area may be preformed into coating pads of the desired length for a particular diameter pipeline. The resistance wire is secured to the preformed pad in such a manner as to form a completed electrical circuit around the pipe. In this regard, it should be noted that instead of utilizing leads 30 it would be possible to utilize leads at the ends of each of the lengths 24 and current will thus travel only through one length of the resistance wire. The two leads which are at the same end of the pad as the length 28 may be utilized to energize this third length of wire independently of the two lengths 24. Another alternative construction is to form a pad such as 20 with the resistance wire mesh disposed only along one side. The pad is then wrapped in a spiral fashion to overlap both areas of coating 12 on either side of weld joint area 16. Such a construction provides for uniform resistance when electrically energized utilizing uniform resistance wire over the length of the pad.

It will also be appreciated that in some instances the pad 18 will be formed from a roll of material comprising the thermoplastic layer and the adhesive insert panel but without the resistance wire mesh. The pads will be cut to the desired length for the particular diameter of pipe and the resistance wires will then be tack welded to the thermoplastic layer and the appropriate leads connected. A particular advantage of the article and method herein described for use in field coating the weld joint areas of pipelines is that the electric welding units already in the field for welding the pipe may be used to supply the current. This further adds to the economy and practicality of application of the present invention.

Having thus described the invention, we claim:

1. A method of joining first and second segments of thermoplastic material, said first segment comprising spaced apart sections of a corrosion protective pipe coating and said second segment comprising a sheet of material adapted to be placed around a pipe in overlapping relationship to said first segment, said method comprising:

providing a resistance wire;
placing first and second lengths of said resistance wire in spaced apart relationship along said sheet in locations whereby when said sheet is wrapped around a pipe each of said lengths will circumscribe the pipe;

placing a third length of wire on said sheet in transverse relationship to said first and second lengths whereby when said sheet is wrapped around the pipe said third length will extend longitudinally of the pipe a distance greater than the distance between said spaced apart sections;

wrapping said sheet around said spaced apart sections of said first segment in overlapping relationship to the latter to bring said segments into contiguous relationship with said resistance wire sandwiched therebetween; and energizing said wire to thereby produce sufficient heat to weld said segments together.

2. A method as set forth in claim 1, wherein is included the step of applying pressure against said segments when the latter are in their sandwiched positions.

3. A method as set forth in claim 1, wherein said step of providing a resistance wire comprises providing a wire mesh.

4. A method as set forth in claim 3, wherein said step of providing a wire mesh comprises providing a nichrome wire mesh.

5. A method as set forth in claim 1, wherein said segments are each a minimum of about 25 mils in thickness.

6. A method as set forth in claim 5, wherein said step of providing a resistance wire comprises providing a wire mesh and said energizing step comprises providing a current of no more than about 50 amps.

7. A method as set forth in claim 1, wherein said energizing step comprises energizing all of said lengths simultaneously from a single current source, the resistance value of each length having been selected to provide for uniform heating throughout all lengths.

8. A method as set forth in claim 7, wherein said step of providing a resistance wire comprises providing a wire mesh.

9. A method as set forth in claim 8, wherein said step of providing a wire mesh comprises providing a nichrome wire mesh.

10. A method as set forth in claim 9, wherein said segments are each a minimum of about 25 mils in thickness.

11. A method as set forth in claim 10, wherein said step of providing a resistance wire comprises providing a wire mesh and said energizing step comprises providing a current of no more than about 50 amps.

12. An article adapted for use in covering an exposed area of a length of pipe that is coated with a thermoplastic coating, said article comprising:

a layer of thermoplastic material characterized by sufficient flexibility to permit wrapping around the pipe;

a resistance wire coupled with said layer of material at the surface thereof, said wire extending in two parallel stretches at the surface of said layer of material, there being a third stretch of said wire extending in transverse relationship to said first two stretches at a location adjacent one end of said layer of material, whereby when said layer is wrapped around the pipe with its ends overlapping said third stretch of material is sandwiched between said overlapped ends and said first and second stretches are sandwiched between said layer of material and said pipe coating.

13. An article as set forth in claim 14, wherein said resistance wire comprises a wire mesh.

14. An article as set forth in claim 13, wherein each of said layer of material and said coating is at least about 25 mils in thickness.

15. A method of spanning an uncoated area of pipeline coated with a thermoplastic material on either side of said area, said method comprising the steps of:

providing a sheet of thermoplastic material characterized by a width greater than the width of said uncoated area and an adhesive panel secured to one side of said sheet with said panel having a width approximately equal to the width of said uncoated area and a thickness approximately equal to the thickness of said coating, said sheet being further characterized by a resistance wire mesh extending along said sheet on either side of said panel;

conforming said flexible sheet to the configuration of said pipe surface with said adhesive panel occupying said uncoated area;

bringing said sheet into contiguous relationship with said thermoplastic material comprising the pipe coating with said resistance wire mesh sandwiched between the coating and said sheet; and energizing said wire mesh to produce sufficient heat to weld said sheet to said coating.

16. A method set forth in claim 15 wherein said thermoplastic material in said pipe coating and said sheet has a thickness of 25 to 95 mils.

17. A method as set forth in claim 15 wherein said energizing step comprises providing a current of no more than about 50 amps.

18. An article adapted for use in covering an uncoated area of a length of pipe that is coated with a thermoplastic coating material, said article comprising:

a sheet of thermoplastic material characterized by a width greater than the width of said uncoated area, sufficient flexibility to permit the sheet to be conformed to the configuration of the pipe surface, and an adhesive panel secured to one side of said sheet, said panel having a width approximately equal to the width of said uncoated area and a thickness approximately equal to the thickness of said coating;

a length of resistance wire mesh coupled with said sheet along the edge of the sheet on the same side as said panel and on both sides of the latter whereby when said sheet is placed in contact with the pipe coating said wire mesh will be sandwiched between the sheet and the coating.

19. An article as set forth in claim 18 wherein said thermoplastic material of said coating and said sheet each has a thickness of 25 to 95 mils.

* * * * *